US006175740B1

United States Patent
Souissi et al.

(10) Patent No.: US 6,175,740 B1
(45) Date of Patent: Jan. 16, 2001

(54) METHOD AND APPARATUS IN A WIRELESS COMMUNICATION SYSTEM FOR ADAPTIVELY SELECTING A RESOLUTION FOR DETERMINING AND REPORTING LOCATION INFORMATION

(75) Inventors: Slim Souissi, Fort Worth; Thomas Casey Hill, Trophy Club, both of TX (US)

(73) Assignee: Motorola, Inc., Schaumburg, IL (US)

( * ) Notice: Under 35 U.S.C. 154(b), the term of this patent shall be extended for 0 days.

(21) Appl. No.: 09/315,908

(22) Filed: May 20, 1999

(51) Int. Cl.[7] .............................. H04Q 7/36; H04Q 7/20
(52) U.S. Cl. .................... 455/456; 455/403; 455/457; 455/500; 455/517; 342/357.01; 342/457; 342/450; 342/357.02
(58) Field of Search ..................... 455/456, 403, 455/550, 421, 457, 560, 517, 500; 342/450, 452, 456, 457, 357.01, 357.02; 340/988

(56) References Cited

U.S. PATENT DOCUMENTS 5,548,583   8/1996   Bustamante .................... 370/18

*Primary Examiner*—Fan Tsang
*Assistant Examiner*—Keith Ferguson
(74) *Attorney, Agent, or Firm*—R. Louis Breeden

(57) ABSTRACT

A portable subscriber unit (122) and a controller (112) cooperate to maintain (402) a table (226, 326) identifying operations that utilize location information, and corresponding resolutions preferred for the location information when performing ones of the operations. When a request to perform an operation is received (404), the portable subscriber unit and the controller cooperate to select (408) a resolution preferred for the operation, in response to the request; and then to determine (414) and report (418) the location information at the resolution preferred for the operation.

21 Claims, 3 Drawing Sheets

METHOD AND APPARATUS IN A WIRELESS COMMUNICATION SYSTEM FOR ADAPTIVELY SELECTING A RESOLUTION FOR DETERMINING AND REPORTING LOCATION INFORMATION

FIELD OF THE INVENTION

This invention relates in general to wireless communication systems, and more specifically to a method and apparatus in a wireless communication system for adaptively selecting a resolution for determining and reporting location information.

BACKGROUND OF THE INVENTION

Location determining technologies are becoming increasingly important in wireless communication systems. The utility of a 911 emergency call placed through a cellular telephone, for example, can be greatly enhanced when the cellular telephone system is able to provide an accurate location of the subscriber making the call.

Many different technologies have been devised for determining location. The resolution of the location determining technologies varies widely depending upon factors such as the type of technology, the amount of data reserved for the location determination, the bandwidth of the location signal, the number of measurements made, the conditions during the measurement, and other factors. Tradeoffs can be made to modify the resolution of the location estimate. In general, for a given location technology, a high resolution estimate can come at the expense of a longer time to fix, a lower battery life, a greater over-the-air overhead, additional signal bandwidth, additional signal strength, and higher latency, in varying combinations.

Many operations which utilize location information do not require high resolution location estimates (or do not require high resolution immediately). For example, location based weather services only require a resolution the size of an entire city. Other operations such as real-time turn-by-turn travel directions can require a very high resolution. There are also operations where a low resolution is sufficient for a quick monitoring of the location and where a high resolution can follow later with longer latency.

Thus, what is needed is method and apparatus in a wireless communication system for adaptively selecting a resolution for determining and reporting location information associated with a portable subscriber unit. Preferably, the method and apparatus will select and report the location information at a resolution preferred for a particular operation that is being performed.

SUMMARY OF THE INVENTION

An aspect of the present invention is a method in a wireless communication system for adaptively selecting a resolution for determining and reporting location information associated with a portable subscriber unit. The method comprises the steps of maintaining a table identifying a plurality of operations that utilize the location information, and a corresponding plurality of resolutions preferred for the location information when performing ones of the plurality of operations; and receiving a request to perform an operation included in the plurality of operations. The method further comprises the steps of selecting from the plurality of resolutions the resolution preferred for the operation, in response to the request; and then determining and reporting the location information at the resolution preferred for the operation.

Another aspect of the present invention is a portable subscriber unit in a wireless communication system for adaptively selecting a resolution for determining and reporting location information associated with the portable subscriber unit. The portable subscriber unit comprises a receiver for receiving the location information, and a processing system coupled to the receiver for processing the location information. The portable subscriber unit further comprises a requesting and reporting interface coupled to the processing system for receiving a request and for reporting the location information in response thereto. The processing system is programmed to cooperate with a fixed portion of the wireless communication system to maintain a table identifying a plurality of operations that utilize the location information, and a corresponding plurality of resolutions preferred for the location information when performing ones of the plurality of operations; and to receive the request to perform an operation included in the plurality of operations. The processing system is further programmed to cooperate with the fixed portion to select from the plurality of resolutions the resolution preferred for the operation, in response to the request; and then to determine and report the location information at the resolution preferred for the operation, via the requesting and reporting interface.

Another aspect of the present invention is a controller in a wireless communication system for adaptively selecting a resolution for determining and reporting location information associated with a portable subscriber unit. The controller comprises a network interface for conducting communications with a network, and a processing system coupled to the network interface for processing the communications. The controller further comprises a base station interface coupled to the processing system for controlling a base station to communicate with the portable subscriber unit. The processing system is programmed to cooperate with the portable subscriber unit to maintain a table identifying a plurality of operations that utilize the location information, and a corresponding plurality of resolutions preferred for the location information when performing ones of the plurality of operations; and to receive the request to perform an operation included in the plurality of operations. The processing system is further programmed to cooperate with the portable subscriber unit to select from the plurality of resolutions the resolution preferred for the operation, in response to the request; and then to determine and report the location information at the resolution preferred for the operation.

DETAILED DESCRIPTION OF THE DRAWINGS

Figure 1:
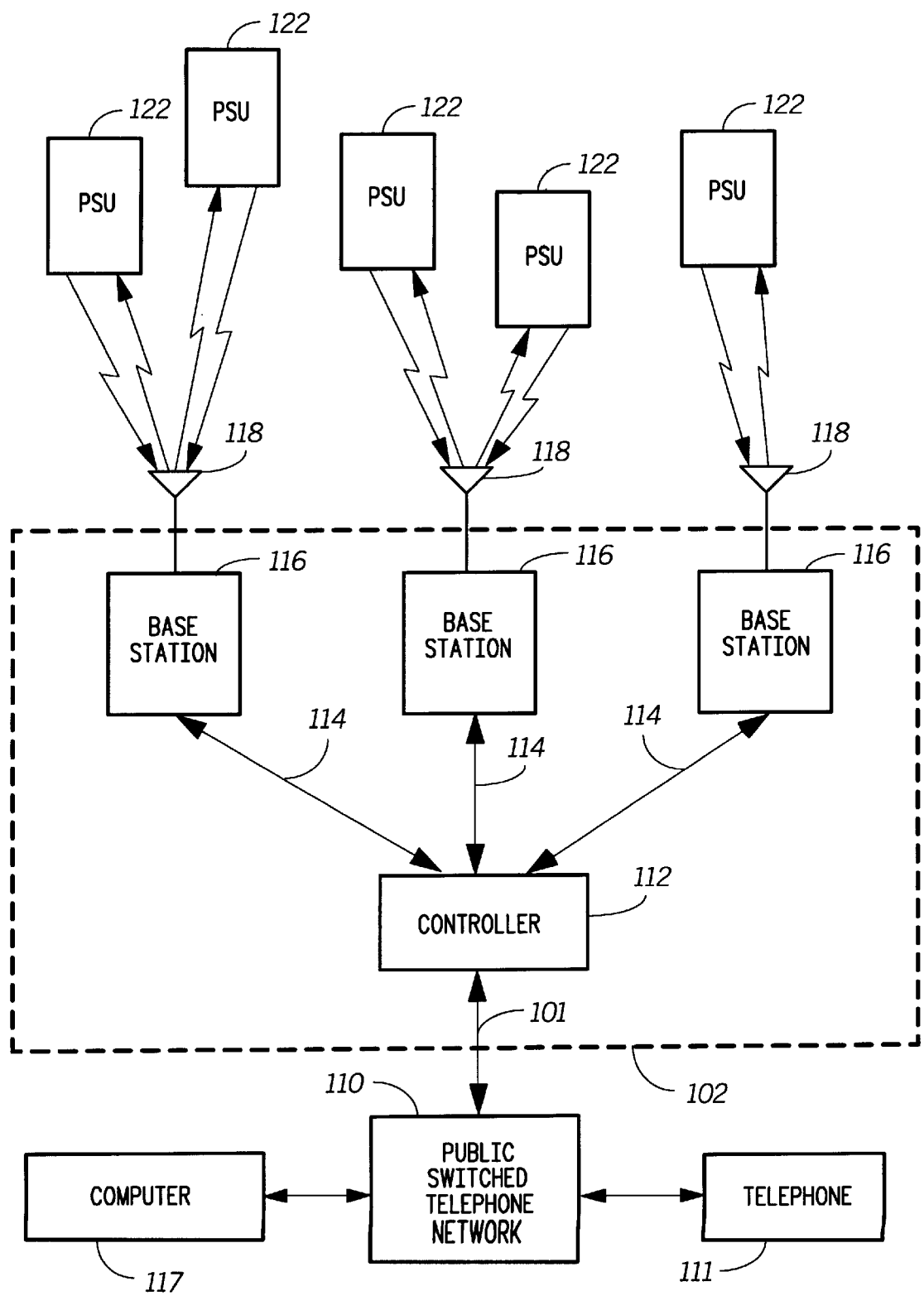
FIG. 1 is an electrical block diagram of an exemplary wireless communication system in accordance with the present invention.

Referring to FIG. 1, an electrical block diagram depicts an exemplary wireless communication system in accordance with the present invention, comprising an fixed portion 102 including a controller 112 and a plurality of conventional base stations 116, the communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention. The hardware of the base stations 116 is preferably a combination of the RF-Orchestra!™ transmitter and the RF-Audience!™ receiver manufactured by Motorola, Inc. The portable subscriber units 122 are preferably similar to PageWriter™ 2000 data portable subscriber units, also manufactured by Motorola, Inc., and also utilize software modified in accordance with the present invention. It will be appreciated that other similar hardware can be used as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by a message originator, as well as commands originated by the controller 112 for adjusting operating parameters of the radio communication system. The RF signals preferably transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. It will be further appreciated that the computer 117 can also function as a server for providing various applications utilized by the wireless communication system. In that mode, the computer 117 can be coupled directly to the controller 112 without going through the PSTN.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the preferred embodiment is a two-way wireless communication system, as depicted in FIG. 1, aspects of the present invention also are applicable to a one-way wireless communication system, as well.

Figure 2:
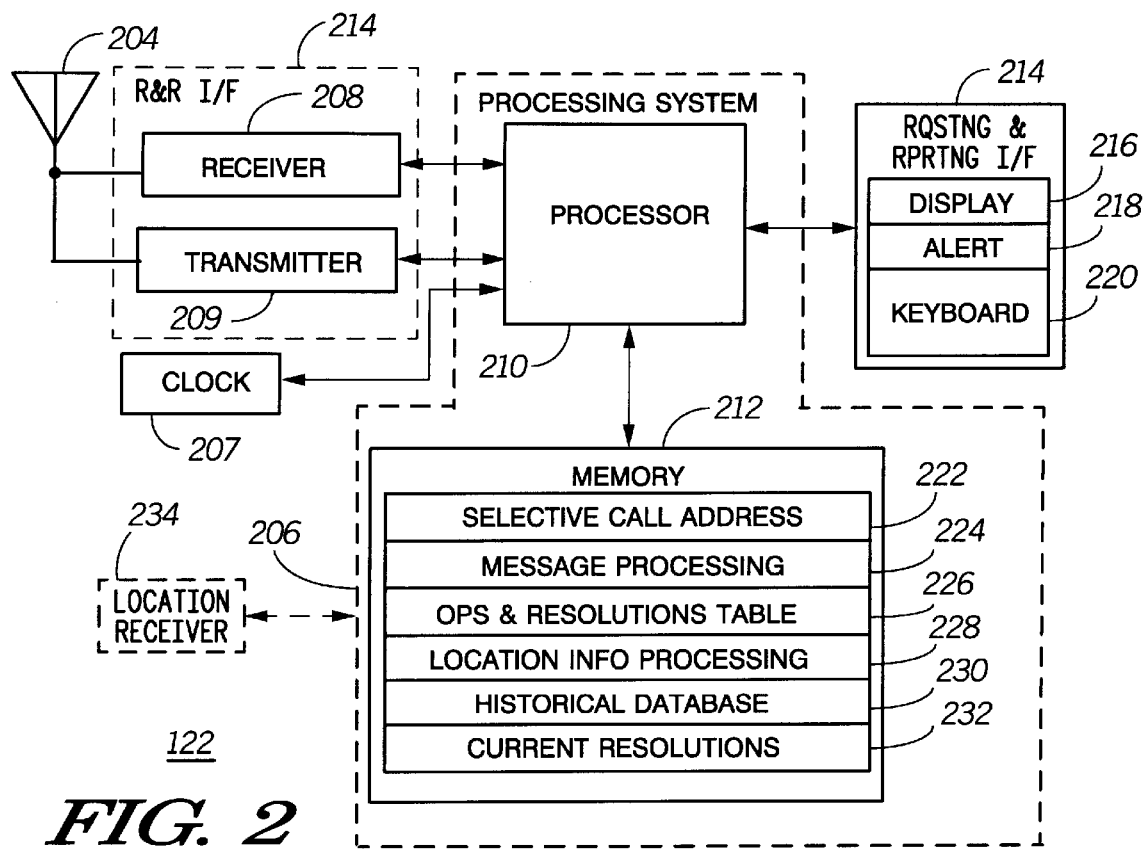
FIG. 2 is an electrical block diagram of an exemplary portable subscriber unit in accordance with the present invention.

FIG. 2 is an electrical block diagram of the exemplary portable subscriber unit 122 in accordance with the present invention. The portable subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the portable subscriber unit 122 in accordance with the present invention. A requesting and reporting interface 214 preferably is also coupled to the processing system 206 for interfacing with a user. The requesting and reporting interface 214 comprises a conventional keyboard 220 for requesting that an operation be performed and for controlling the portable subscriber unit 122, a conventional display 216 for reporting location information associated with the operation, and a conventional alert element 218 for alerting the user when an outbound message arrives. It will be appreciated that for some operations, such as receiving an outbound message requesting that the location of the portable subscriber unit 122 be determined and reported to the fixed portion 102, the receiver 208 and the transmitter 209 also are included in the requesting and reporting interface 214. A conventional clock 207 is also coupled to the processing system 206 for supporting time keeping requirements of the portable subscriber unit 122.

The processing system 206 comprises a conventional processor 210 and a conventional memory 212. The memory 212 comprises software elements and data for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 further comprises an operations and resolutions table 226 for identifying a plurality of operations that utilize location information, and a corresponding plurality of resolutions preferred for the location information when performing ones of the plurality of operations. The memory 212 also includes a location information processing program 228 for programming the processing system 206 to cooperate with the controller 112 to process location information at a resolution selected in accordance with the present invention. The memory 212 also includes space for storing a historical database 230 of date-stamped location information. The memory 212 further comprises a record of current resolutions 232 corresponding to operations in progress that require location information. In one embodiment, the portable subscriber unit 122 also includes a location receiver 234, such as a Global Positioning System (GPS) receiver, coupled to the processing system 206 for helping determine the location information through well-known techniques. Operation of the portable subscriber unit 122 in accordance with the present invention will be described in detail further below.

Figure 3:
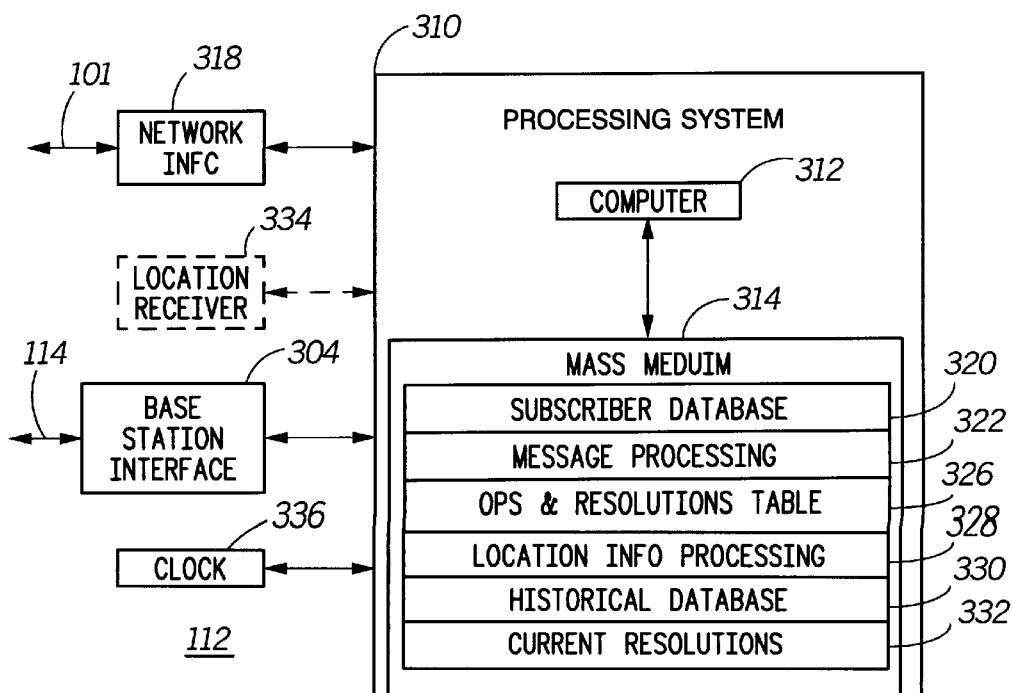
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes an operations and resolutions table 326 for identifying a plurality of operations that utilize location information, and a corresponding plurality of resolutions preferred for the location information when performing ones of the plurality of operations. The mass medium 314 also includes a location information processing program 328 for programming the processing system 310 to cooperate with the portable subscriber unit 122 to process location information at a resolution selected in accordance with the present invention. The mass medium 314 also includes space for storing a historical database 330 of date-stamped location information corresponding to portable subscriber units 122 operating in the wireless communication system. The mass medium 314 further comprises a record of current resolutions 332 corresponding to portable subscriber units 122 having an operation in progress that requires location information. In one embodiment, the controller 112 also includes a location receiver 334, such as a GPS receiver, for helping determine the location information through well-known techniques. Operation of the controller 112 in accordance with the present invention will be described further below.

Figure 4:
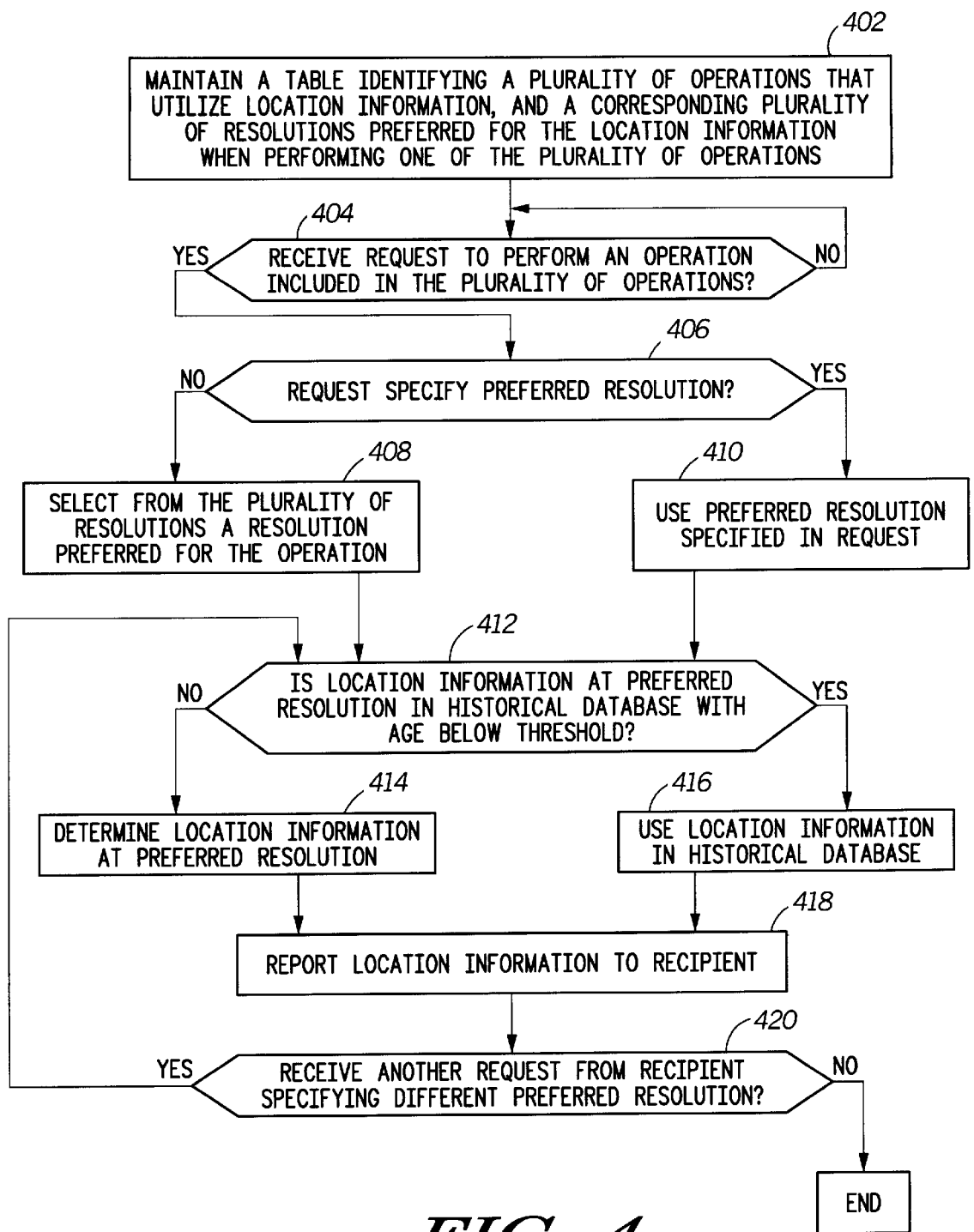
FIG. 4 is a flow diagram depicting operation of the exemplary wireless communication system in accordance with the present invention.

FIG. 4 is a flow diagram depicting operation of the exemplary wireless communication system in accordance with the present invention. The flow diagram begins with the wireless communication system maintaining 402 a table identifying a plurality of operations that utilize the location information, and a corresponding plurality of resolutions preferred for the location information when performing ones of the plurality of operations. The table preferably resides primarily in the processing system 310 of the controller 112 as the operations and resolutions table 326. A portion of the table also can reside in the portable subscriber unit 122 as the operations and resolutions table 226. For example, an operation that requires only location information readily available to the portable subscriber unit 122, such as a transmitter color code or cell identifier, can be identified in the operations and resolutions table 226 of the portable subscriber unit 122. On the other hand, an operation requiring assistance from the fixed portion, such as server-aided GPS location determination, is preferably identified in the operations and resolutions table 326 of the controller 112. When the portable subscriber unit 122 receives a request for an operation not included in the operations and resolutions table 226, it preferably requests, through the inbound channel, assistance from the fixed portion 102 in performing the operation.

Next, the portable subscriber unit 122 checks 404 whether it has received a request to perform an operation included in the plurality of operations that utilize location information. A request can originate from the user of the portable subscriber unit 122, e.g., the user can request a display of the location of the portable subscriber unit 122. Alternatively, a request can originate from the fixed portion of the system, e.g., in a two-way system, someone (or some application) can request that the portable subscriber unit 122 determine and report its position. When the portable subscriber unit 122 receives a request, the portable subscriber unit 122 checks 406 whether the request also specifies a preferred resolution. If so, the preferred resolution specified in the request is used 410 for the requested operation. If not, the portable subscriber unit 122 selects 408 the resolution indicated in the table 226 as preferred for the requested operation. When the operation is not listed in the table 226, the portable subscriber unit 122 obtains the preferred resolution from the controller 112. It will also be appreciated that, alternatively, a device resolution can be selected dependent upon a resolution capability of a device which will receive the location information, and that the device resolution can be substituted for the preferred resolution.

In any case, the portable subscriber unit 122 then checks 412 whether the location information is available at the preferred resolution in the historical database 230, 330. If so, the location information in the historical database 230, 330 is used 416 for the operation. If not, the portable subscriber unit 122 determines 414 the location information at the preferred resolution, obtaining assistance from the fixed portion 102 when necessary. (It will be appreciated that, in some instances, the portable subscriber unit 122 can determine the location information with no assistance from the fixed portion 102. This is true, for example, when the portable subscriber unit is equipped with an independent GPS receiver not using a server assist.) In either case, the portable subscriber unit 122 then reports 418 the location information to the recipient. Next, the portable subscriber unit 122 checks 420 whether another request has been received from the recipient specifying a preferred resolution different from the resolution used in performing the operation. If so, the portable subscriber unit 122 returns to step 412. If not, the process ends.

It will be appreciated that in the above process, the recipient of the location information can be the same entity that generated the request, or a different entity, depending on the operation requested. For example, a user of the portable subscriber unit 122 can request his own position be displayed by the portable subscriber unit 122. In this case, the requester and the recipient are the same entity. Alternatively, the user can request that his position be reported to the fixed portion 102. In this case, the requester and the recipient are different entities.

It will be further appreciated that determining the location information can require selecting a location determining technology, e.g., cell ID, enhanced observed time difference (E-OTD), and GPS, appropriate for the resolution preferred. In addition, determining the location information can require adjusting system parameters to achieve the resolution preferred. Such parameters include the amount of location data used in estimating the location, the averaging window size (i.e., the number of measurements made), and the channel bandwidth. It will also be appreciated that many applications will not require the preferred resolution immediately. Instead, such applications can permit first determining and reporting the location information at a lower resolution than preferred, and then improving and reporting the resolution over time until reaching the preferred resolution.

Thus, it should be clear from the preceding disclosure that the present invention advantageously provides a method and apparatus in a wireless communication system for adaptively selecting a resolution for determining and reporting location information associated with a portable subscriber unit. Advantageously, the method and apparatus can select and report the location information at the resolution preferred for a particular operation that is being performed.

Many modifications and variations of the present invention are possible in light of the above teachings. Thus, it is to be understood that, within the scope of the appended claims, the invention can be practiced other than as specifically described herein above.

What is claimed is:

1. A method in a wireless communication system for adaptively selecting a resolution for determining and reporting location information associated with a portable subscriber unit, the method comprising the steps of:

maintaining a table identifying a plurality of operations that utilize the location information, and a corresponding plurality of resolutions preferred for the location information when performing ones of the plurality of operations;

receiving a request to perform an operation included in the plurality of operations;

selecting from the plurality of resolutions the resolution preferred for the operation, in response to the request; and then determining and reporting the location information at the resolution preferred for the operation.

2. The method of claim 1, wherein the determining and reporting step comprises the step of selecting a location determining technology appropriate for the resolution preferred.

3. The method of claim 1, wherein the determining and reporting step comprises the step of adjusting system parameters to achieve the resolution preferred.

4. The method of claim 1, further comprising the steps of:

keeping a historical database of the location information; and accessing the historical database to determine the location information of the portable subscriber unit, when the location information has an age below a predetermined threshold.

5. The method of claim 1, wherein the request comprises a requested resolution for the location information, and wherein in the determining and reporting step the requested resolution overrides the resolution preferred for the operation.

6. The method of claim 1, wherein the determining and reporting step comprises the steps of:

first determining and reporting the location information at a lower resolution than preferred; and then improving and reporting the resolution over time until reaching the resolution preferred.

7. The method of claim 1, wherein the receiving step comprises the step of receiving the request from a requester to send the location information to a recipient different from the requester, and wherein the method further comprises the step of sending the location information to the recipient, in response to the request.

8. The method of claim 1, wherein the receiving step comprises the step of receiving the request from a requester to send the location information to the requester, and wherein the method further comprises the step of sending the location information to the requester, in response to the request.

9. The method of claim 1, further comprising the steps of:

receiving from a recipient of the location information a new request for the location information to be reported at a second resolution different from the resolution at which the location information was initially sent; and determining and reporting the location information at the second resolution, in response to the second request.

10. The method of claim 1, wherein the method further comprises the step of selecting a device resolution dependent upon a resolution capability of a device which will receive the location information; and wherein the determining and reporting step comprises the step of determining and reporting the location information at the device resolution.

11. A portable subscriber unit in a wireless communication system for adaptively selecting a resolution for determining and reporting location information associated with the portable subscriber unit, comprising:

a receiver for receiving the location information;

a processing system coupled to the receiver for processing the location information; and a requesting and reporting interface coupled to the processing system for receiving a request and for reporting the location information in response thereto, wherein the processing system is programmed to cooperate with a fixed portion of the wireless communication system to:

maintain a table identifying a plurality of operations that utilize the location information, and a corresponding plurality of resolutions preferred for the location information when performing ones of the plurality of operations;

receive the request to perform an operation included in the plurality of operations;

select from the plurality of resolutions the resolution preferred for the operation, in response to the request; and then determine and report the location information at the resolution preferred for the operation, via the requesting and reporting interface.

12. The portable subscriber unit of claim 11, wherein the processing system is further programmed to cooperate with the fixed portion to select a location determining technology appropriate for the resolution preferred.

13. The portable subscriber unit of claim 11, wherein the processing system is further programmed to cooperate with the fixed portion to adjust system parameters to achieve the resolution preferred.

14. The portable subscriber unit of claim 11, wherein the processing system is further programmed to cooperate with the fixed portion to:

keep a historical database of the location information; and access the historical database to determine the location information of the portable subscriber unit, when the location information has an age below a predetermined threshold.

15. The portable subscriber unit of claim 11, wherein the request comprises a requested resolution for the location information, and wherein the processing system is further programmed to cooperate with the fixed portion to override the resolution preferred for the operation.

16. The portable subscriber unit of claim 11, wherein the processing system is further programmed to cooperate with the fixed portion to:

first determine and report the location information at a lower resolution than preferred; and then improve and report the resolution over time until reaching the resolution preferred.

17. The portable subscriber unit of claim 11, wherein the processing system is further programmed to receive the request from a requester to send the location information to a recipient different from the requester, and cooperate with the fixed portion to send the location information to the recipient, in response to the request.

18. The portable subscriber unit of claim 11, wherein the processing system is further programmed to receive the request from a requester to send the location information to the requester, and cooperate with the fixed portion to send the location information to the requester, in response to the request.

19. The portable subscriber unit of claim 11, wherein the processing system is further programmed to:

receive from a recipient of the location information a new request for the location information to be reported at a second resolution different from a first resolution at which the location information was initially sent; and cooperate with the fixed portion to determine and report the location information at the second resolution, in response to the new request.

20. The portable subscriber unit of claim 11, wherein the processing system is further programmed to:

select a device resolution dependent upon a resolution capability of a device which will receive the location information; and determine and report the location information at the device resolution.

21. A controller in a wireless communication system for adaptively selecting a resolution for determining and reporting location information associated with a portable subscriber unit, the controller comprising:

a network interface for conducting communications with a network;

a processing system coupled to the network interface for processing the communications; and a base station interface coupled to the processing system for controlling a base station to communicate with the portable subscriber unit, wherein the processing system is programmed to cooperate with the portable subscriber unit to:

maintain a table identifying a plurality of operations that utilize the location information, and a corresponding plurality of resolutions preferred for the location information when performing ones of the plurality of operations;

receive a request to perform an operation included in the plurality of operations;

select from the plurality of resolutions the resolution preferred for the operation, in response to the request; and then determine and report the location information at the resolution preferred for the operation.

* * * * *